United States Patent [19]

Ueki

[11] Patent Number: 5,204,593
[45] Date of Patent: Apr. 20, 1993

[54] DRIVE SYSTEM FOR INFORMATION RECORDING/REPRODUCING APPARATUS

[75] Inventor: Yasuhiro Ueki, Sagamihara, Japan

[73] Assignee: Victor Company of Japan, Ltd., Yokohama, Japan

[21] Appl. No.: 831,598

[22] Filed: Feb. 5, 1992

[30] Foreign Application Priority Data

Nov. 8, 1991 [JP] Japan .................. 3-321367

[51] Int. Cl.$^5$ .............................. H02P 7/00
[52] U.S. Cl. ................... 318/254; 318/138; 367/44.28
[58] Field of Search .......... 369/44.27, 44.28, 44.29, 369/44.25; 360/98.01; 318/685, 696, 34, 634, 599, 284, 138, 439

[56] References Cited

U.S. PATENT DOCUMENTS

| | | | |
|---|---|---|---|
| 4,207,601 | 6/1980 | Desai et al. | 318/634 X |
| 4,533,995 | 8/1985 | Christian et al. | |
| 4,609,953 | 9/1986 | Mizuno et al. | 318/696 X |
| 4,831,469 | 5/1989 | Hanson et al. | |
| 4,885,517 | 12/1989 | Pennock | 318/599 X |
| 5,012,166 | 4/1991 | Ushijima et al. | 318/254 |
| 5,036,264 | 7/1991 | Ueki | |
| 5,084,661 | 1/1992 | Tanaka | 369/44.28 |
| 5,090,001 | 2/1992 | Ito et al. | 369/44.28 |

FOREIGN PATENT DOCUMENTS

| | | |
|---|---|---|
| 59-901 | 1/1984 | Japan. |
| 2-146590 | 6/1990 | Japan. |
| 2-190973 | 7/1990 | Japan. |
| 3-7089 | 1/1991 | Japan. |
| 3-20094 | 2/1991 | Japan. |
| 3-25348 | 5/1991 | Japan. |

Primary Examiner—Jonathan Wysocki
Attorney, Agent, or Firm—Lowe, Price, LeBlanc & Becker

[57] ABSTRACT

A drive system for an information recording/reproducing apparatus having a recording head to record and reproduce information on and from an information recording disc, the drive system being equipped with a spindle motor for rotating the information recording disc and a voice coil motor for moving the recording head to a target track of said recording disc. These motors are arranged to be driven through motor drivers. Also included in the system is a power supply monitoring device for monitoring a power supply voltage coupled to the spindle motor driver and the voice coil motor driver to output a signal corresponding to the monitored power supply voltage. This output signal of the monitoring device is supplied to a control section which controls voltages of the spindle motor driver and the voice coil motor driver in accordance with the output signal of the monitoring device. This arrangement allows the drive system to be operated with a relatively low voltage.

5 Claims, 7 Drawing Sheets

DRIVE SYSTEM FOR INFORMATION RECORDING/REPRODUCING APPARATUS

BACKGROUND OF THE INVENTION

The present invention relates to a drive system for use in an information recording/reproducing apparatus.

Various disc drive apparatus have been devised hitherto with a view to reducing the demand (consumed electric power). A first known technique, as disclosed in the Japanese Utility Model Publication No. 3-25348, is that in a magnetic disc drive apparatus the servo signals and the data signals are alternately disposed so that in the non-selected state the reproduction circuit is operated only at the timing of the servo signal in movement of the head to a given track and the power supply to the reproduction circuit is stopped in the other data intervals. A second conventional technique involves drive-controlling a spindle motor for a magnetic disc by detecting the back electromotive voltage of the motor without using a position detecting element such as a Hall device, as disclosed in the Japanese Patent Provisional Publication No. 3-7809 (U.S. Pat. No. 5,036,264) where in start the winding is compulsorily energized with the open loop by means of an external oscillation start circuit. A third prior art technique involves the control of the motor due to the back electromotive voltage, i.e., the drive method of the brushless DC motor not having a position detector, as disclosed in the Japanese patent Provisional Publication No. 2-146590. In addition, a fourth prior art technique, i.e., the Japanese patent Provisional Publication No. 2-190973, discloses a technique for the demand reduction by two control modes to be taken at start and after the start and a fifth conventional technique, i.e., the Japanese Utility Model Provisional Publication No. 3-20094, discloses a spindle motor allowing a size-reduced and thickness-reduced hard disc drive (HDD) apparatus.

Figure 9A:
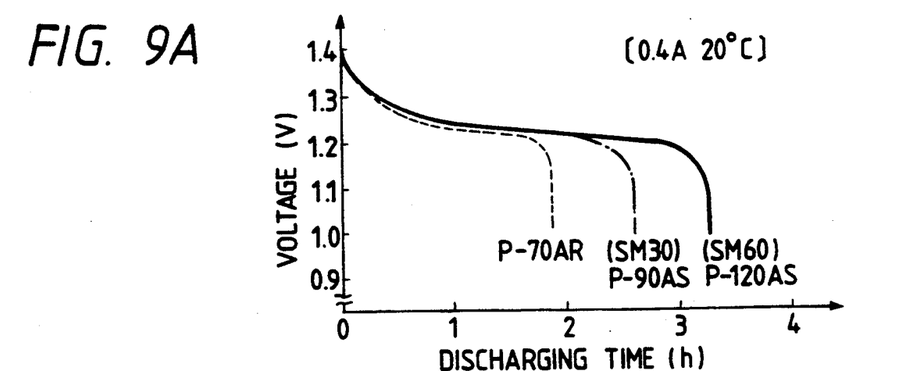
FIGS. 9A to 9C are illustration for describing the discharge characteristic of a general battery.
Figure 9B:
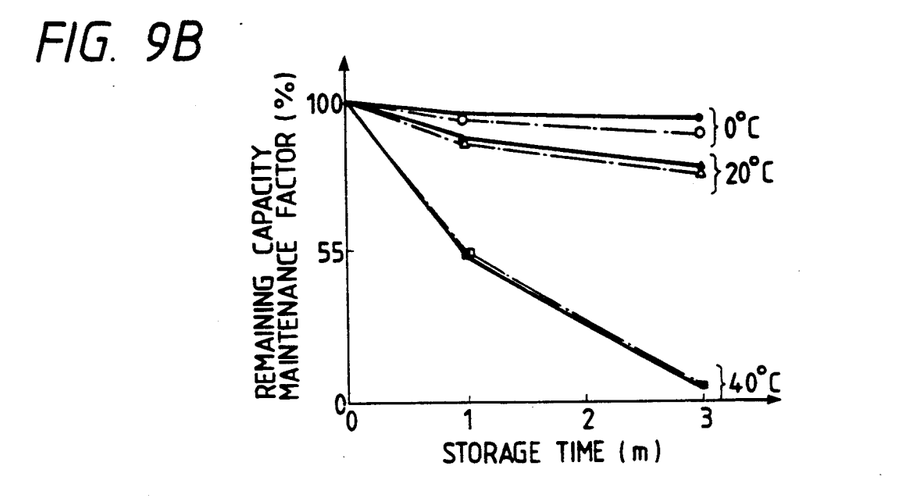
Figure 9C:
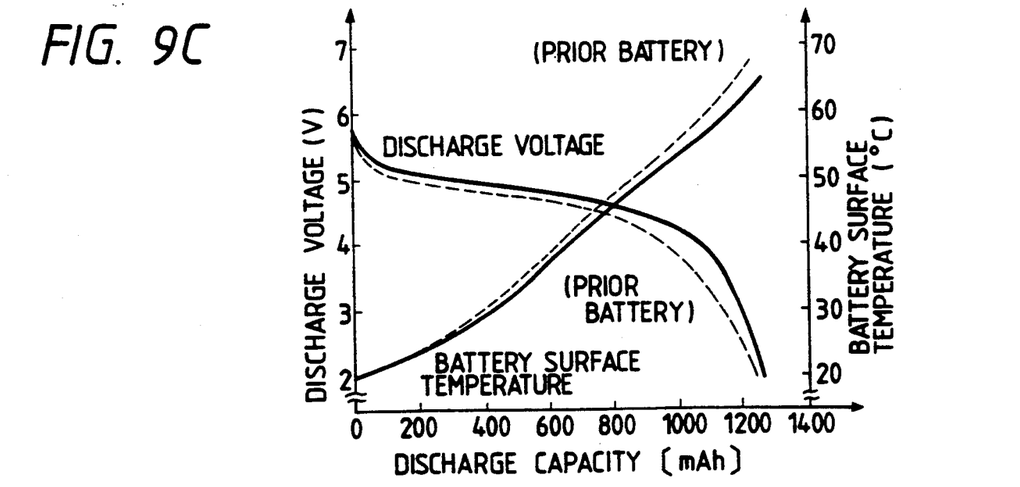

However, there are problems which arise with such conventional apparatus in that 1) the power supply voltage is required to be above 5 V whereby a small-sized battery or batteries become inapplicable to the drive of the apparatus; 2) the power consumed in a logic portion such as a logic IC is substantially a loss component such as Joule heat and the demand is great; and 3) the power supply voltage range for the operation is as narrow as 5 V±5% (±10% at the most). These problems substantially occur due to the ability of the battery. Generally, the discharge characteristic of the Ni-Cd battery which is widely used is that the voltage is lowered in accordance with the passage of time and a rapid discharge occurs from the vicinity of 1.2 V for only 2 or 3 hours as illustrated in FIG. 9A when continuously supplying a current of 400 mA. Further, the capacity of the battery decreases due to the self-discharge as illustrated in FIG. 9B. This is because the voltage varies in response to the variation of the load (current) and the internal heating amount becomes large in response to increase in the current.

SUMMARY OF THE INVENTION

It is therefore an object of the present invention to provide an information recording/reproduction apparatus which is operable in a voltage range of 3 to 5 V and which is capable of reducing the the electric power to be consumed.

According to the present invention there is provided a drive system for an information recording/reproducing apparatus having a recording head to record and reproduce information on and from an information recording disc, the drive system being equipped with a spindle motor for rotating the information recording disc and a voice coil motor for moving the recording head to a target track of the recording disc. These motors are driven through a spindle motor driver and a voice coil motor driver which are constructed with a circuit element operable by a low voltage. Also included in the drive system is power supply monitoring means for monitoring a power supply voltage applied to the spindle motor driver and the voice coil motor driver to output a signal corresponding to the monitored power supply voltage. Control means controls voltages of the spindle motor driver and the voice coil motor driver in accordance with the output signal of the monitoring means.

Preferably, the drive system further includes: power saving means for detecting an operating state of circuit portions constituting said drive system so as to stop the supply of the power supply voltage to the circuit portion which is in a non-operating state; temperature detecting means for detecting a temperature within the drive system to output a signal indicative of the detected temperature, the output signal of the temperature detecting means being supplied to the control means so that the control means controls the voltages of the spindle motor driver and the voice coil motor driver in accordance with the output signal of the temperature detecting means in addition to the output signal of the monitoring means; and means for changing control modes of said spindle motor and said voice coil motor in accordance with the output signal of said monitoring means.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
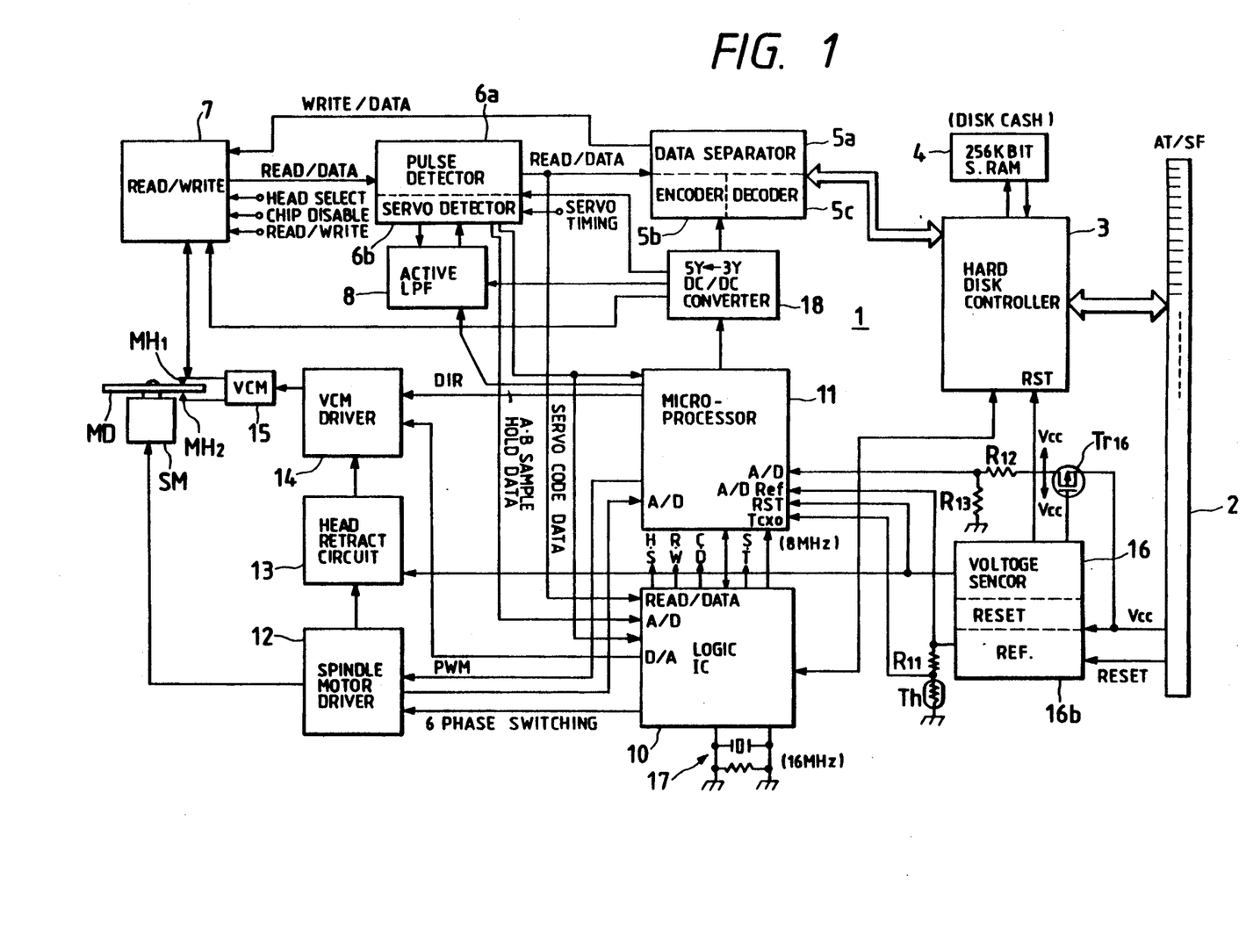
FIG. 1 is a circuit block diagram showing an information recording/reproducing apparatus according to an embodiment of the present invention.

Referring now to FIG. 1, there is illustrated a circuit arrangement of an information recording/reproducing system according to an embodiment of the present invention, designated at numeral 1, where the circuit per each IC chip is indicated by a solid-line block. In FIG. 1, illustrated at character MD is a magnetic disc such as 2.5 inch magnetic disc which acts as an information data recording medium. The magnetic disc MD is attached to a rotor constituting a spindle motor SM fixedly secured to a base (housing) so as to be rotatable integrally with the spindle motor SM. On the surfaces of the disc MD there are areas each of which is divided into a plurality of tracks and which is also divided into a plurality of sectors in the rotational direction. A servo signal is disposed at the head portion of each sector and a data area is formed at a position subsequent to the head portion so as to constitute the so-called embedded servo system. Further, at the innermost circumferential portion of the disc MD there is formed the so-called shipping area.

Figure 2:
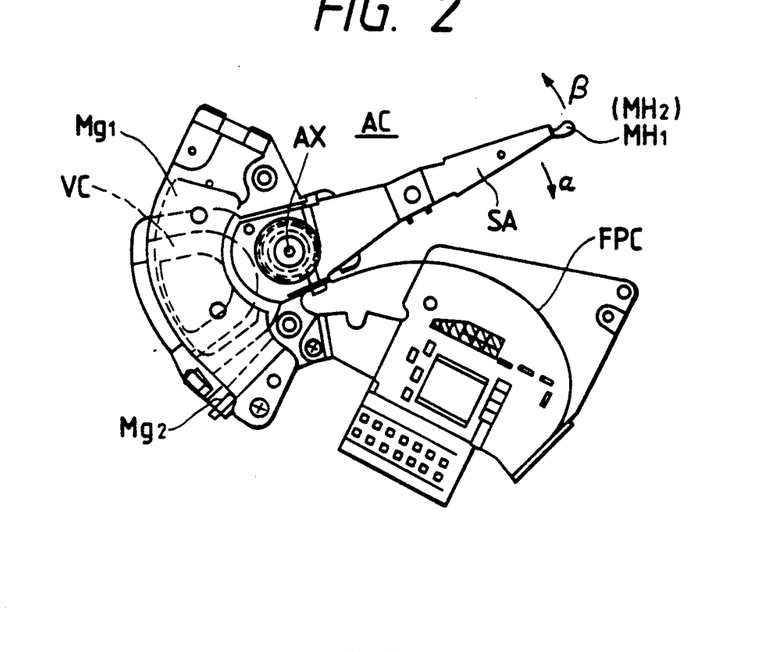
FIG. 2 is an illustration of an actuator and peripheral devices to be used in the information recording/reproducing apparatus of this invention.

Illustrated at characters MH1 and MH2 are magnetic heads for tracking the surfaces of the disc MD which heads are generally of the MIG (Metal in Gap) type. As illustrated in FIG. 2, each of the magnetic heads MH1 and MH2 is attached to the tip portion of a rotatable type swinging arm SA. In FIG. 2, there are further illustrated an actuator AC and the peripheral mechanism thereof. A voice coil VC is disposed at the opposite side with respect to a rotating shaft AX of the arm SA and a magnetic circuit including a magnet Mg1 is formed in opposed relation to the voice coil VC so as to constitute a voice coil motor for rotation of the arm SA.

Further, a magnet Mg2 is disposed at a predetermined position of the vicinity of the actuator AC in relation to the shipping area of the disc MD so as to lock the swinging arm SA by means of a magnetic attracting force. The heads MH1 and MH2 stay at a position corresponding to this magnet Mg2 position at the time of start and stop of rotation of the motor SM. Further, in response to the energization to the voice coil VC, the arm SA (i.e., heads MH1, MH2) overcomes the attracting force of the magnet Mg2 and rotates in the direction indicated by an arrow $a$. In order to minimize the load due to this rotation, a flexible printed circuit FPC is used for a power supply line and a signal line.

Returning again to FIG. 1, a hard disc drive apparatus (which will be referred hereinafter to as HDD) and a host computer, not shown, which constitute the information recording/reproducing system 1 are coupled to each other through the IBM AT/XT where interfaces are constructed with an integrally formed connector including a plurality of pin terminals such as power supply pin terminals. A HDC (Hard Disc Controller) 3 is used as an IC between the interfaces so that control signals and recording/reproducing address and data are transmitted between the host computer and the HDD. Here, for example, in connection to the HDC 3, a 256 Kbit static RAM (S. RAM) 4 is provided which acts as a buffer to store data of 8 bit×32 k (256 Kbit) at maximum. At the time of read of signals, the disc cache function (see U.S. Pat. No. 4,533,995) of the read look ahead is carried out. In addition, the error correction function (Reed Solomon sign correction) is carried out in order to improve the quality of the signal.

Secondly, a description will be made hereinbelow in terms of the writing and reading operations of data to and from the disc MD. In the case of writing the information from the host computer, the HDC 3 temporarily stores the NRZ (Non-Return to Zero) write data from a connector 2 to the buffering S.RAM 4, and at the writing timing, an encoder 5b performs the 1-7RLL (Run Length Limited) modulation of the information and, after the write precompensation, a read/write section 7 directly writes the information on a given track through the magnetic heads MH1 and MH2. Here, it is preferable that the writing is effected in accordance with the so-called zoned bit recording system in which the transfer rate is increased at the outer circumference of the magnetic disc MD and decreased at the inner circumference thereof so as to improve the entire storage capacity as disclosed in the Japanese Patent Publication No. 59-901.

On the other hand, when reading the recording information, since the data signals read out from the magnetic heads MH1 and MH2 are in analog states, the data signals are shaped (digitized) in waveform shaping circuit included in a pulse detector 6. Here, in the case that the above-mentioned zoned bit recording system is adapted for writing, a microprocessor 11 operates an active LPF (Low-Pass Filter) 8, which switches the frequency characteristic at the time of the zone switching, so that noises are eliminated therefrom. Thereafter, in a data separator 5a and a decoder 5c, the data recorded in accordance with the above-mentioned 1-7RLL modulation system is decoded to the NRZ data in synchronism with the reproduction clock by a PLL (Phase Locked Loop) encased in the data separator 5a and then error-corrected in the HDC 3 and outputted to the host computer.

The positioning of the magnetic head MH (MH1 and MH2) on the tracks of the disc MD can be effected on the basis of the head positioning servo signal provided at the head portion of each sector. The servo signal includes a timing signal for producing a servo signal, position information indicating the track number and two burst signals (A, B bursts) which are detailed position information for the tracking control. In cases where the head MH correctly tracks the central line of the track, a rough position information code is inputted to a logic calculation section (logic IC) 10 on the basis of the reproduction data obtained from the head MH through a pulse detector 6a and decoded so as to be supplied to the microprocessor ($\mu$. Com) 11. On the other hand, the A and B bursts which are detailed position information are extracted in accordance with the timing signal produced by the pulse detector 6a, and the position information data independently sampled and held every burst is digitized by a high-speed flush type A/D converter of the logic calculation section 10 and then supplied to the microprocessor 11. The microprocessor 11 supplies a control data (an error voltage) to the logic calculation section 10 so that the error (voltage) between the data and the target track becomes zero. The control voltage is converted into an analog form by means of a D/A converter of the logic calculation section 10 so as to be applied to a VCM (voice coil motor) driver 14, thereby surely performing the positioning of the magnetic head MH.

Figure 3:
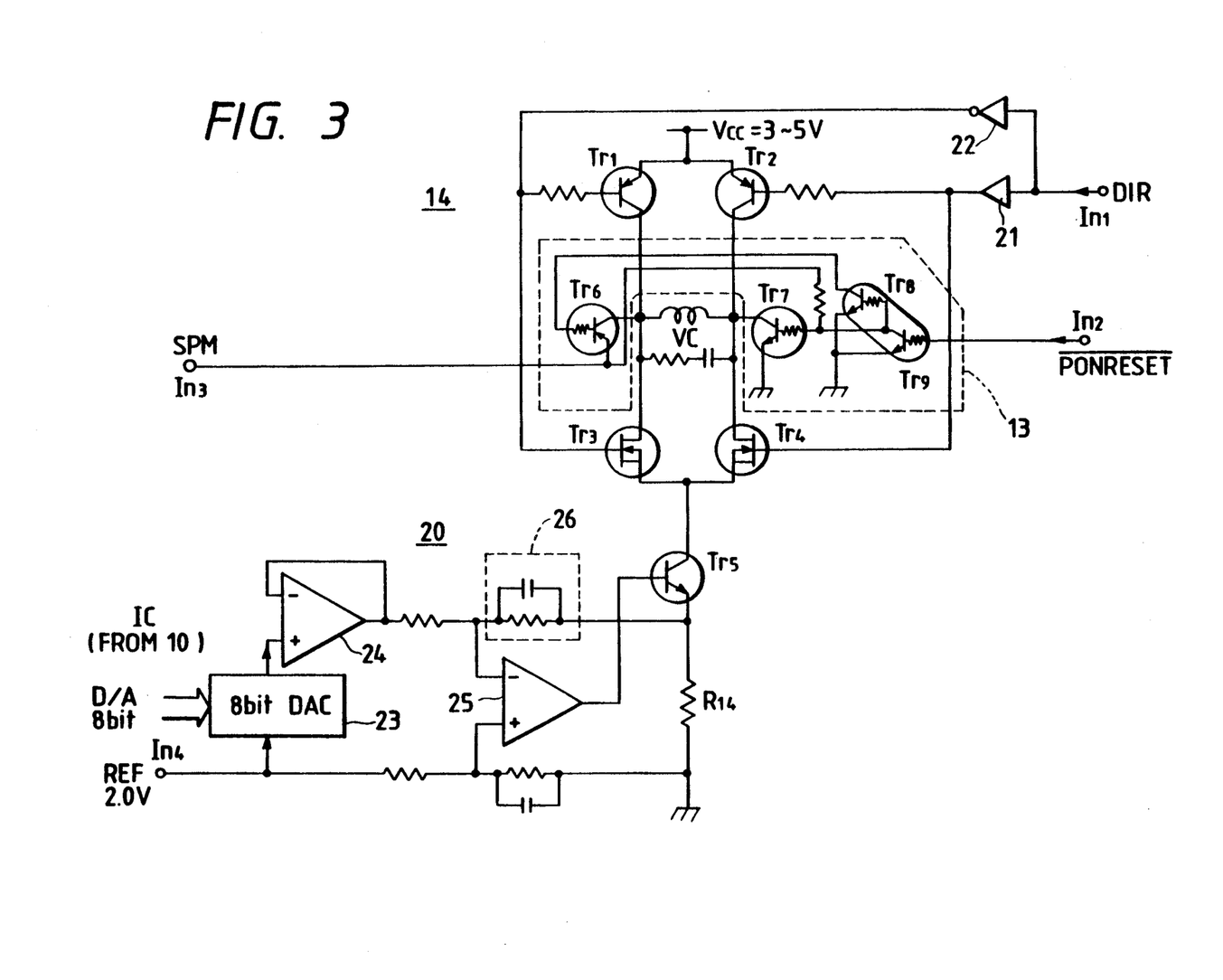
FIG. 3 shows a circuit arrangement of a voice coil motor driver of the FIG. 1 information recording/reproducing apparatus.

The VCM driver 14 is composed of a plurality of transistors Tr1 to Tr5 as shown in FIG. 3. Here, the portion surrounded by a dotted line corresponds to a head retract circuit 13. As illustrated, a DIR (direction switching) signal is inputted from the microprocessor 11 to an input terminal In1, and then supplied through a buffer amplifier 21 to the base of the transistor Tr2 and the gate of the FET (field effect transistor) Tr4, and thereafter led to the base of the transistor Tr1 and the gate of the FET Tr3 after being inverted by an inverter 22.

With the above-described arrangement, the four transistors Tr1 to Tr4 are switched in accordance with the sign (plus and minus) of the DIR signal so that the direction of the current flowing through the voice coil VC constituting a VCM (Voice Coil Motor) 15 is switched and the D/A output of the logic calculation section 10 is supplied to the lower-side transistor Tr5 and the VCM 15 is driven in response to the error voltage, whereby the magnetic head MH is moved to the target track (the fine tracking adjustment is performed). Here, the reason that the FETs are used as Tr3 and Tr4 is that they are operable with a relatively low voltage. The further description of the circuit illustrated in FIG. 3 will be made hereinafter.

Figure 4:
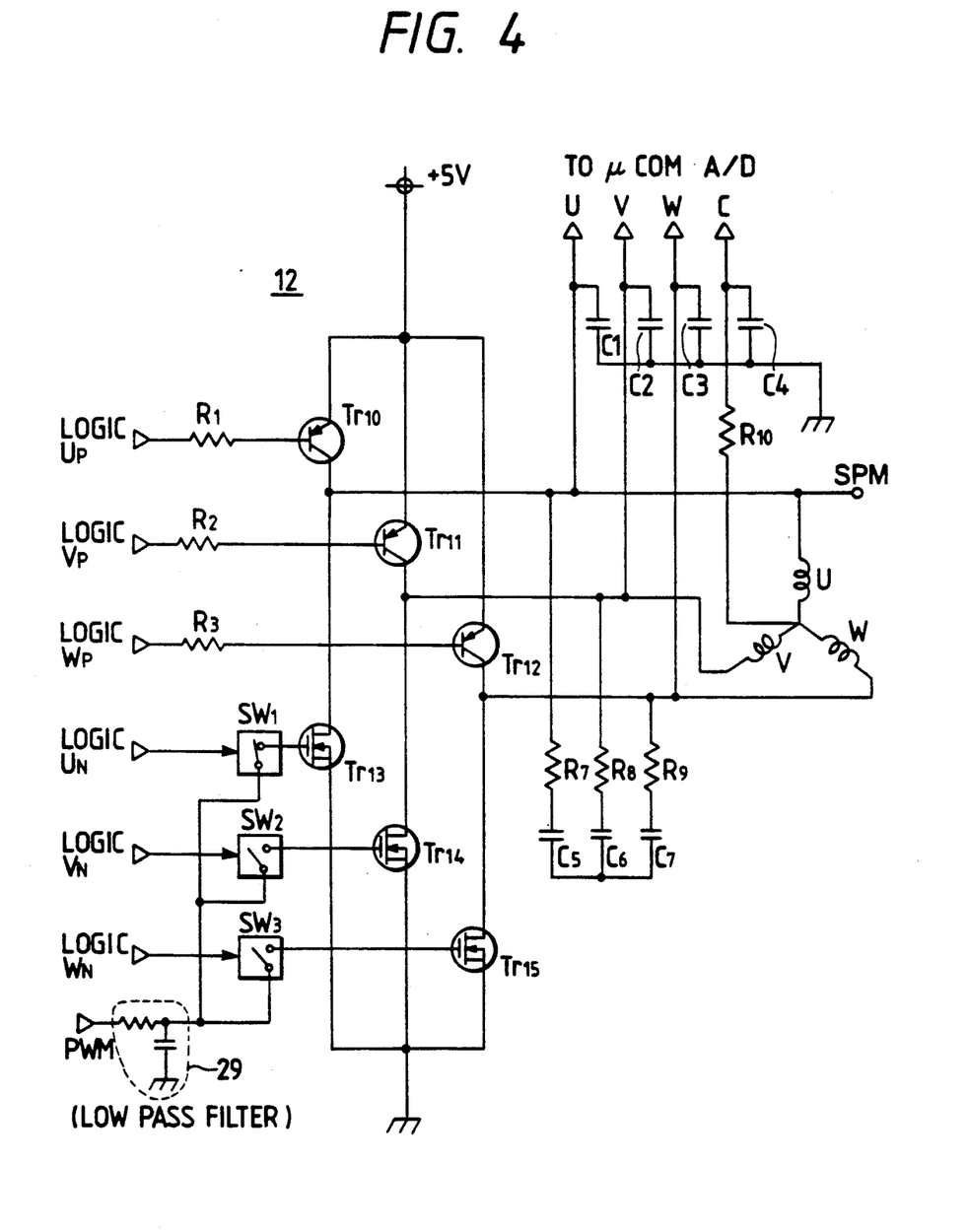
FIG. 4 is a circuit diagram showing an arrangement of a spindle motor driver of the FIG. 1 information recording/reproducing apparatus.

FIG. 4 shows a detailed circuit arrangement of a spindle motor driver 12. The spindle motor driver 12 is controllable in accordance with the above-mentioned second to fourth prior art techniques. The spindle motor SM is arranged so as not to have a rotation (phase) detecting sensor and arranged such that the winding takes a star-connection structure and the coils U, V and W are three-phase and full-wave-driven, and the back electromotive voltage generated from the winding of the motor SM at the time of start is digitized by the A/D converter of the microprocessor 11 to produce position information so as to switch the current directions (flow) of 6 transistors Tr10 to Tr15 in accordance with the position information. In FIG. 4, the reason that MOS FETs are used as the transistors Tr13 to Tr15 is that they are operable with a relatively low voltage. If the power supply voltage is slightly increased, it is also possible to use the usual transistors. The PWM (Pulse Width Modulation) signal to be supplied to the gates of the FETs Tr13 to Tr15 has a duty ratio of 100% at the time of start of the motor and, when reaching the rated rotational speed, the current is controlled with a duty ratio of about 50% to cause the rated rotational speed to become 3200 rpm. In response to reaching the rated rotational speed, as disclosed in the above-mentioned third prior art technique, the constant-speed rotation control is made in response to the sector timing signal on the disc MD. A detailed description of the FIG. 4 circuit arrangement will be described hereinafter.

For example, M37700 manufactured by Mitsubishi Electric Corp. is used for the microprocessor 11 shown in FIG. 1. A crystal oscillating element 17 used as a clock generator for the logic calculation section 10 is a logic IC to generate a signal having a high frequency of 16 MHz, which is in turn two-divided by a divider of the logic calculation section 10 so as to be converted into a frequency of 8 MHz and the microprocessor 11 is operated with 3 V.

A power voltage detecting circuit (voltage sensor) 16 is provided for monitoring the power supply voltage to be supplied through a group of pin terminals 2. When this voltage becomes below 2.5 V, the P-channel MOS FET Tr16 for supplying the power to the respective circuits is set to the OFF state (it is appropriate that an N-channel MOS FET having an ON-resistance of about 0.15Ω in the case of 2.5 V is used and ON/OFF-driven with the gate voltage being set to be higher than the power supply voltage Vcc), and the impedances of the other bus lines coupled to the connector 2 are arranged to become high with reset and all the power supply lines are set to OFF to reduce the power to be consumed. For example, as the aforementioned MOS FET Tr16, Si9405 (manufactured by Siliconix Incorporated) can be used which has an On-resistance of about 0.2Ω in the case of 4.5 V. On the other hand, when the power supply voltage exceeds 2.5 V, the MOS FET Tr16 is set to ON so as to supply the power to the respective circuits and the resets of the HDC 3, microprocessor 11 and others are then effected after an elapsed time of about 20 msec. Further, 16b designates a reference voltage setting circuit to produce a reference voltage which is in turn supplied to the microprocessor 11. Simultaneously, the voltage divided by a resistor R11 and a thermistor Th is also applied to the microprocessor 11. The thermistor Th has a nature that its resistance value varies (for example, reduces) in accordance with increase in the temperature, and hence the voltage to be applied to the microprocessor 11 varies (reduces) in accordance with increase in the temperature within the apparatus. Thus, the applied voltage and the voltage directly given from the reference voltage setting circuit 16b are A/D-converted and the temperature is measured on the basis of the difference therebetween.

Figure 10:
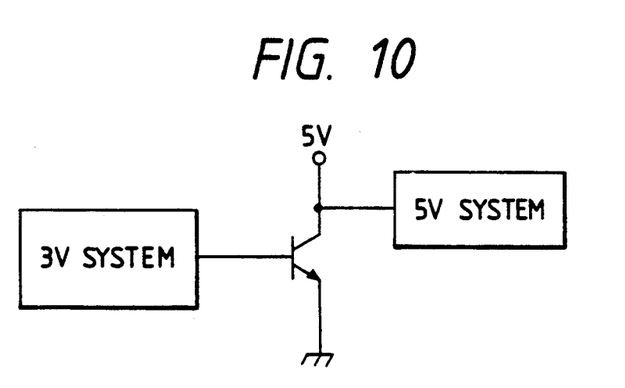
FIG. 10 illustrates an interface circuit between a 3 V system circuit and a 5 V system circuit.

Furthermore, the microprocessor 11 also compares the voltage directly applied from the reference voltage setting circuit 16b with the voltage (A/D-converted value) obtained by dividing the power supply voltage Vcc by resistors R12 and R13 in order to measure the variation of the power supply voltage Vcc. In addition, the microprocessor 11 includes a function to control a DC/DC converter 18 to stop the power supply to such a part of the apparatus as the data separator 5a, pulse detector 6a, read/write section 7 and others when not required. Here, the DC/DC converter 18 converts a voltage of about 3 V into a voltage of 5 V which is in turn applied to the active LPF 8 and others. This is because a portion of the circuit is arranged to be operable with the voltage of 5 V. Thus, for example, a circuit as illustrated in FIG. 10 is used as an interface between the 3 V signal system and the 5 V signal system.

When the power supply is turned OFF by the reset signal, the voltage sensor 16 causes the magnetic head MH to move to the shipping zone of the disc MD and further to attractively come into contact with the locking magnet Mg2. For this operation, the energy of the back electromotive voltage generated from the winding of the spindle motor SM is given to the voice coil motor 15 whereby the reset signal for moving the head MD is outputted to the head retract circuit 13 (see U.S. Pat. No. 4,831,469), thereby preventing the disc MD recording surface from being wounded by the head MD.

Figure 5:
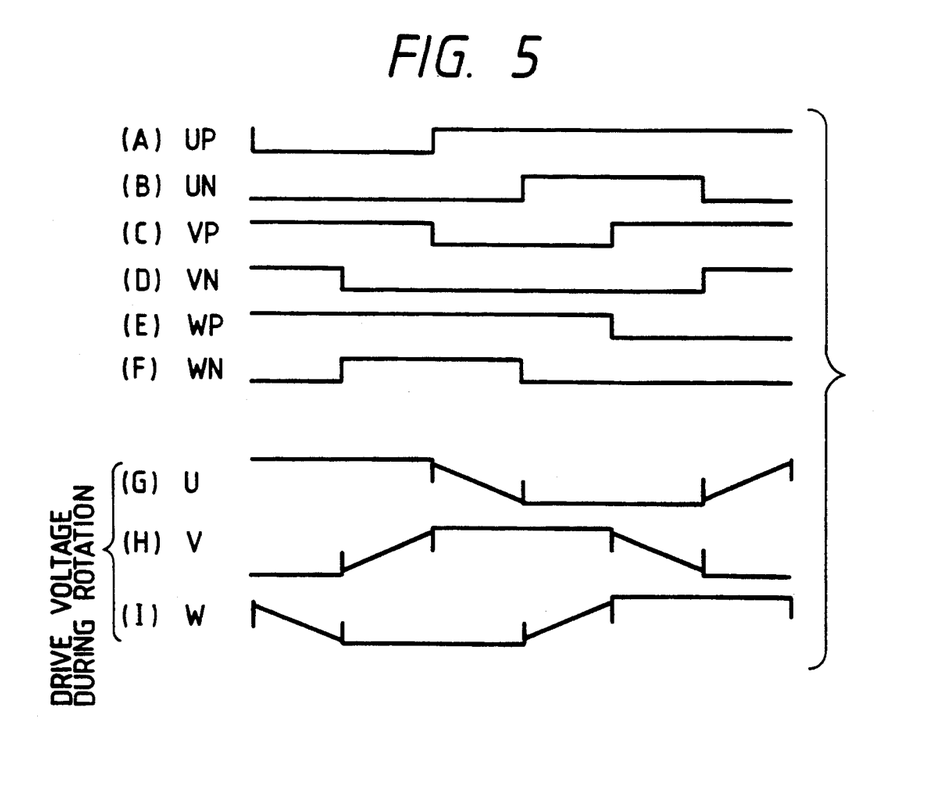
FIG. 5 is a timing chart for describing the operation of a spindle motor of the FIG. 1 information recording/reproducing apparatus.

A detailed description will be made hereinbelow in terms of the start of the spindle motor SM which is a principal portion of this invention. As illustrated in FIG. 4, the driver 12 for the spindle motor SM with the star-connection winding is arranged to be 3-phase and full-wave-driven and arranged such that the commutation is effected at an electric angle of 120° so as to cause the rotational force to generate in a constant direction by means of the three transistors Tr10 to Tr12 whose emitters are coupled to the power supply Vcc (5 V) and the three MOS FETs Tr13 to Tr15 whose sources are grounded. For performing the constant-rotation control of the motor SM, the FETs Tr13 to Tr15 are respectively coupled through analog switches Sw1 to Sw3 for switching the gates of the FETs Tr13 to Tr15 to the PWM (pulse width modulation) signal from the microprocessor 11 which PWM is converted into a direct-current signal to some degree by a low-pass filter (integrating circuit) 29 so as to control the current amount. These switches Sw1 to Sw3 are operated by the microprocessor 11 in accordance with the back electromotive voltage of the winding, which is detected by the A/D converter of the microprocessor 11, so as to perform the switching operations of the 6 transistors Tr10 to Tr15 to rotate the motor SM (see the above-mentioned second and fourth prior art technique). Here, since the back electromotive voltage is not generated at the time of the start of the motor SM, the transistors Tr10 to Tr15 are energized in open loop at predetermined timings from an external circuit by means of the microprocessor 11 at the time of the start to excite the winding coils U, V and W. The predetermined timings are taken in order of Tr10, Tr13, ..., Tr12, Tr15 as illustrated in (A) to (F) of FIG. 5.

When the inertia of the motor SM including its load is taken to be J, the torque of the motor SM is taken as T and the rotational angle from the start of rotation of the motor SM up to the n rotations is $\theta_n$, the time (period) $t_n$ corresponding to one cycle at the time of the start can generally be calculated in accordance with the following equation.

$$t_n = (2J/T)^{\frac{1}{2}}(\theta_n^{\frac{1}{2}} - \theta_{n-1}^{\frac{1}{2}}) \qquad (1)$$

Figure 6A:
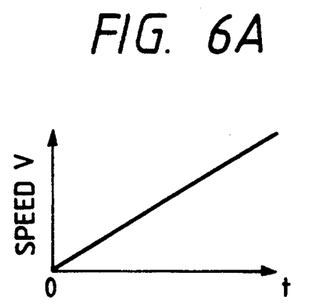
FIGS. 6A to 6D are illustrations for describing the start control characteristic of the spindle motor.
Figure 6B:
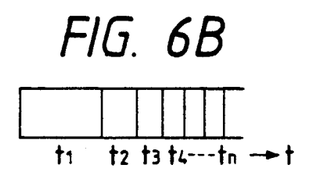
Figure 6C:
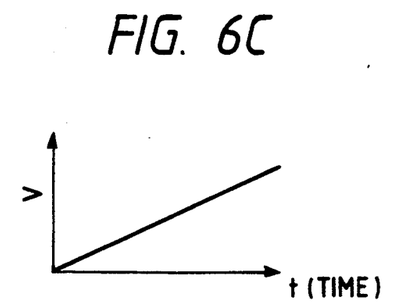
Figure 6D:
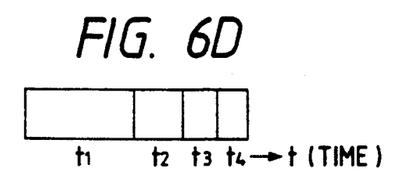

Here, this equation is satisfied under the condition that the spindle motor SM completely follows the excitation. FIGS. 6A to 6D show the start control characteristic of the motor SM. As shown in FIGS. 6B and 6D, the energization time becomes shorter in accordance with increase in the rotational speed of the motor SM. In the aforementioned equation (1), the torque T can be obtained as $T = K_T I$ where $K_T$ represents the torque constant and I designates the current flowing through the winding. The torque constant $K_T$ is determined for each motor, while the current I is proportional to the power supply voltage Vcc and takes a value obtained by dividing the voltage Vcc by the winding resistance because the loss due to the transistors Tr10 to Tr15 is extremely small in the case that the transistors Tr10 to Tr15 are completely in the ON states. For example, in the case of using 2SB1301 (manufactured by NEC Corp.) for the transistors Tr10 to Tr12, the saturation voltage $V_{CESAT}$ is 0.15 V when supplying a current of 1A. Further, for example, in the case of using MOS FET 2SK1960 (manufactured by NEC Corp.) for the transistors Tr13 to Tr15, they are operable even when the power supply voltage is below 3 V, the conductive resistance between the gate and the source under 2.5 V is 0.15Ω, the circuit loss is about 0.24 V when the current is 600 mA, and the loss is below 10% when the power supply voltage is 3 V. Accordingly, the torque T is substantially proportional to the power supply voltage, and hence the time $t_n$ varies in proportion to the square root of the power supply voltage. This time $t_n$ is for the follow-up of the motor like an induction motor and hence the follow-up of the motor can be deteriorated in case that the characteristic of the motor and the period do not agree to each other.

Figure 7A:
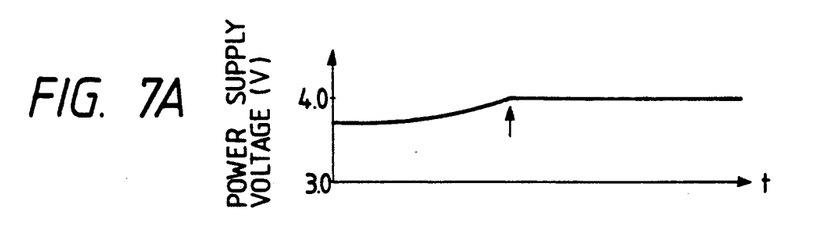
FIGS. 7A to 7C are graphic illustrations of the start operation of the spindle motor.
Figure 7B:
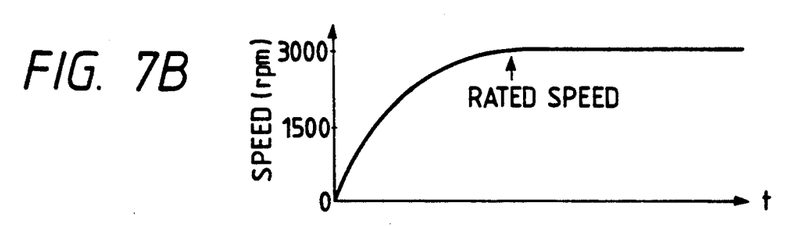
Figure 7C:
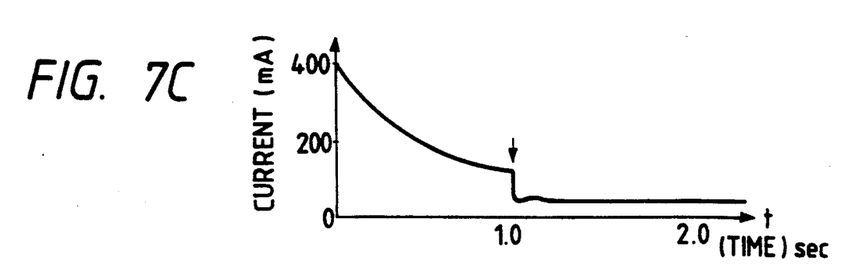

Thus, as described above, the power supply voltage Vcc is A/D-converted, and the voltage value Vcc is measured in a range of 3 to 5 V. Particularly, since a large current of about 600 mA flows at the time of the start of the motor, difficulty is encountered to completely keep the battery voltage to a constant value, and the voltage, rotational speed and current waveform of the motor SM become as illustrated in FIGS. 7A to 7C at the time of the start, and hence the torque T is calculated in accordance with the above-mentioned equation (1) on the basis of the voltage measured immediately after the energization of the winding so as to change and adjust the control time $t_n$ to thereby drive the motor SM. In practice, since the time is taken if the microprocessor 11 performs the calculation of the equation (1), the times $t_n$ ($t_1$, $t_2$, $t_3$, ...) which are standard values in the case of Vcc=5 V are in advance written in a read-only memory (ROM) of the microprocessor 11 and, in the case that the measurement value of the power supply voltage Vcc is below 5 V, the times tn are increased in order of t1, t2, t3, ... in correspondence with the decrease in the voltage Vcc.

For example, when the power supply voltage Vcc becomes 4 V, the times tn are calculated as follows in accordance with the above-mentioned equation (1).

$$\begin{aligned} t_n &= (2J \times 5/4T)^{\frac{1}{2}} \cdot (\theta_n^{\frac{1}{2}} - \theta_{n-1}^{\frac{1}{2}}) \\ &= 1.118 \cdot (2J/T)^{\frac{1}{2}} \cdot (\theta_n^{\frac{1}{2}} - \theta_{n-1}^{\frac{1}{2}}) \end{aligned} \qquad (2)$$

Here, for simplification, when the measurement voltage is Vx, the time $t_{xn}$ to be used in practice is calculated in accordance with the following equation.

$$t_{xn} = t_n + t_n(5 - Vx)/10 \qquad (3)$$

Furthermore, the current varies in accordance with variation of the resistance value of the winding due to variation of the temperature. Thus, as described above, the voltage of the terminal connected to the thermistor Th is A/D-converted so as to measure the temperature so that the time $t_n$ is corrected in accordance with the measurement value. The resistance value R written in the above-mentioned ROM is a value in the case that the temperature is 25° C. and, when the resistance value at the temperature of T° C. is taken as $R_T$, the resistance value $R_T$ can simply be obtained as $R_T = R + R(T-25)/260$. The time $t_n$ is corrected on the basis of this resistance value $R_T$.

Further, a detailed description will be made hereinbelow in terms of the control of the VCM for driving the actuator (illustrated at character AC in FIG. 2). The detailed circuit arrangement of the VCM driver 14 is made as illustrated in FIG. 3 and in the illustration a DAC (D/A converter) 23 is provided in the IC of the logic calculation section 10. Further, transistors Tr6 to Tr9 constitute the head retract circuit 13 which includes a circuit for coupling the signal from the winding of the spindle motor SM to the VCM 15 through a PONRESET (Power On Reset, having a bar) signal to move the magnetic head MH to the shipping area of the disc MD. Transistors Tr1, Tr2 and FETs Tr3, Tr4 of the VCM driver 14 have small-loss performances and make up an H-bridge circuit which switches the direction flowing through the winding VC by means of the DIR output signal of the microprocessor 11. The H-bridge circuit switches the current-flowing direction only, while a transistor Tr5 controls, or finely adjusts, the current value. A current control circuit 20 constitutes a feedback loop by a current feedback resistor R14

(for example, having 5.5 Ω) {and a parallel RC circuit 26 and an operational amplifier 25}, whereby a linear current is arranged to flow with respect to the D/A output of the logic calculation section 10. Here, the operational amplifier 24 is used as a buffer amplifier.

Still further, the head retract circuit 13 will be described hereinbelow with reference to FIG. 3. When the power supply is turned ON, the PONRESET signal supplied through an input terminal In2 becomes H (High), and since at this time a transistor Tr9 takes conductive state, transistors Tr8, Tr7 and Tr6 respectively enter into the non-conductive state. Thus, the power to be supplied from the spindle motor driver 12 through an input terminal In3 is cut. On the other hand, when the power supply is turned OFF so that the reset state is established, the DIR signal from the microprocessor 11 is opened and transistors Tr1 to Tr4 and Tr9 enter into the OFF states whereby transistors Tr6 to Tr8 respectively take the conductive states due to the voltage supplied from the spindle motor driver 12. Thus, the back electromotive voltage generated in the spindle motor SM passes through the winding VC in the direction from the transistor Tr6 to the transistor Tr7 so that the magnetic head MH moves in the direction indicated by an arrow β in FIG. 2 and then reaches the shipping area of the disc MD.

Figure 8A:
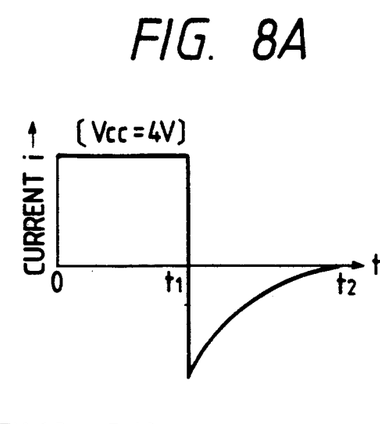
FIGS. 8A to 8D are graphic illustrations for describing the seek control operation of a voice coil motor of the FIG. 1 information recording/reproducing apparatus.
Figure 8B:
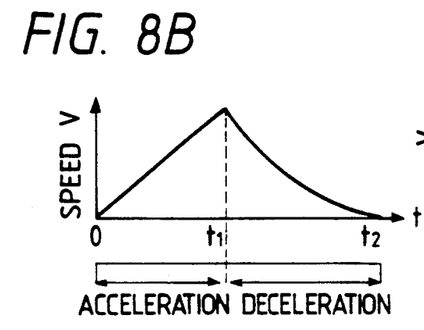
Figure 8C:
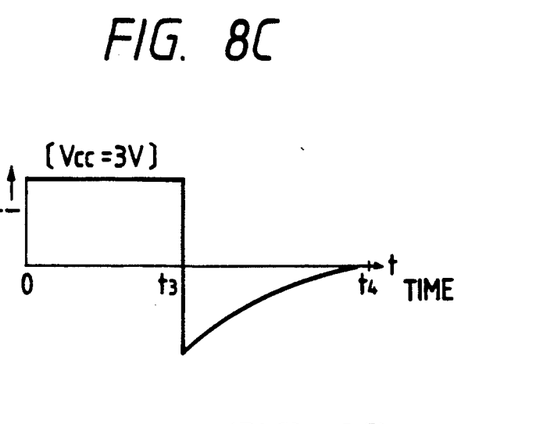
Figure 8D:
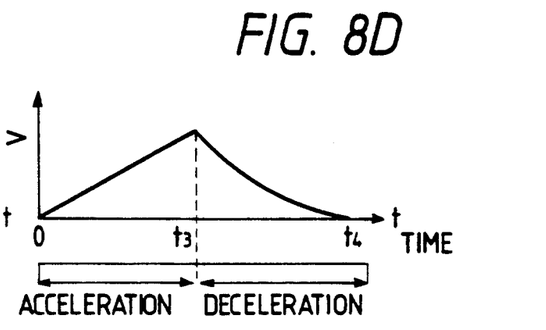

The speed control of the VCM 15 will be described hereinbelow. In the case of supplying the maximum current to the VCM 15, when the coil resistance of the VCM 15 is taken as Rvc and the internal loss of FET and the like is disregarded, since the current I is given as I=Vcc/Rvc, when the power supply voltage Vcc varies between 4 V and 3 V (for example), the current I also varies to 4:3 whereby the VCM 15 takes different seek control characteristics as shown in FIGS. 8A to 8D. Generally, the maximum current to be supplied to the VCM 15 is a constant current which is not affected by the power supply voltage Vcc. However, since in this case the internal loss due to the transistors is great, a current proportional to the power supply voltage Vcc is arranged to flow so that the transistor Tr5 is controlled to take the completely conductive state. That is, at the time of the seek control, the maximum acceleration is first taken with respect to the target track of the disc MD as illustrated in FIGS. 8B and 8D and the deceleration is then started when reaching a predetermined position (time t1 or t3) and thereafter continued non-linearly so that the speed becomes zero at the time t2 or t4 (when reaching the target track).

Here, generally the generation torque is arranged to be constant and the speed table for the deceleration is in advance written in the ROM of the microprocessor 11 so that a desirable deceleration is controlled to be taken in accordance with the speed table. Accordingly, in the apparatus of this invention, since the maximum current is changed when the power supply voltage Vcc varies from 4 V to 3 V (for example) as illustrated in FIGS. 8A and 8C, the acceleration varies as illustrated in FIGS. 8B and 8D. Accordingly, if using the same table, difficulty is encountered to accurately control the speed of the magnetic head MH. In order to eliminate this problem, as well as the case of the spindle motor SM, the power supply voltage Vcc is digitized by the A/D converter of the microprocessor 11 and the value thereof is detected and subtracted from the value written in the ROM of the microprocessor 11 so as to produce a deceleration table corresponding to the voltage value, thereby performing an adequate speed control operation.

Although in the above-described embodiment the parameters are changed on the basis of the power supply voltage Vcc in terms of both the spindle motor SM and VCM 15, it is appropriate that, since in the VCM driver 14 (for example) the current (proportional to the torque) flowing through the voice coil (winding) VC can be measured by amplifying the current of the current-detecting resistor R14 by an operational amplifier with a low offset voltage and A/D-converting it by the A/D converter of the microprocessor 11, the deceleration table is adequately made on the basis of the measured current. In addition, in the case of detecting the value of the power supply voltage Vcc in the VCM 15, since the winding VC varies in accordance with variation of the temperature as well as the winding of the spindle motor SM, it is also possible to adequately make the deceleration table by measuring the temperature by the thermistor TH.

An information recording/reproducing apparatus according to the present invention can provide various effects including:

1) the apparatus is operable by a low power supply voltage below 5 V, the internal loss in the circuit is extremely small and the operable range is as wide as 2.7 to 5.5 V;

2) the efficiency can be improved because the loss due to the Joule heat and the like is small;

3) the noise generation due to the circuit can be reduced;

4) the apparatus can be driven by a battery or batteries and is applicable to wide fields such as a small-sized information equipment;

5) in the logic section the demand (consumed power) can be reduced up to 36% in theory; and 6) the demand is 3 W when the motor is started, 0.8 W at the time of the standby during the motor rotation, and 0.05 W at the time of the standby during the motor stop, and hence the battery lifetime can be lengthened up to about two times.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A drive system for an information recording/reproducing apparatus having head means to record and reproduce information on and from an information recording disc divided into a plurality of tracks and a plurality of sectors, said drive system comprising:
   a spindle motor for rotating said information recording disc;
   signal reading means for reading, through said head means, the information from said information recording disc in units of said sectors;
   a spindle motor drive means coupled to windings of said spindle motor for succesively selecting said windings thereof to supply a drive current thereto so as to drive said spindle motor;
   a voice coil motor for moving said head means to a target track of said information recording disc;
   voice coil motor drive means for driving said voice coil motor;

voice coil motor control means for detecting a servo signal at a head portion of each of said sectors of said information recording disc through said signal reading means so as to supply a control signal to said voice coil motor drive means in accordance with the detected servo signal;

power supply means for generating a power supply voltage which is substantially in a range from 3 volts to 5 volts;

power supply voltage monitoring means for monitoring said power supply voltage to be applied to said spindle motor drive means to output a signal corresponding to the monitored power supply voltage; and spindle motor control means for controlling a voltage to be applied to said spindle motor drive means so as to rotate said spindle motor in accordance with a back electromotive voltage occurring due to said windings of said spindle motor, said spindle motor control means including at least one microprocessor to control said voltage to said spindle motor drive means by changing a parameter of switching time between the drive currents successively supplied to said windings of said spindle motor in accordance with the output signal of said power supply voltage monitoring means when said spindle motor starts.

2. A drive system for an information recording/reproducing apparatus having head means to record and reproduce information on and from an information recording disc divided into a plurality of tracks and a plurality of sectors, said drive system comprising:

a spindle motor for rotating said information recording disc;

signal reading means for reading, through said head means, the information from said information recording disc in units of said sectors;

a spindle motor drive means coupled to windings of said spindle motor for successively selecting said windings thereof to supply a drive current thereto so as to drive said spindle motor;

spindle motor control means for controlling a voltage, to be applied to said spindle motor drive means, so as to rotate said spindle motor in accordance with a back electromotive voltage occurring due to said windings of said spindle motor;

a voice coil motor for moving said head means to a target track of said information recording disc;

voice coil motor drive means for driving said voice coil motor;

power supply means for generating a power supply voltage which is substantially in a range from 3 volts to 5 volts;

power supply voltage monitoring means for monitoring said power supply voltage to be applied to said voice coil motor drive means to output a signal corresponding to the monitored power supply voltage; and voice coil motor control means for detecting a servo signal at a head portion of each of said sectors of said information recording disc through said signal reading means so as to supply a control signal to said voice coil motor drive means in accordance with the detected servo signal, said voice coil motor control means including at least one microprocessor to control a voltage, to be applied to said voice coil motor drive means, by changing a parameter of current for acceleration and deceleration of said voice coil motor in accordance with the output signal of said power supply voltage monitoring means when said voice coil motor is in a seek state.

3. A drive system for an information recording/reproducing apparatus having head means to record and reproduce information on and from an information recording disc divided into a plurality of tracks and a plurality of sectors, said drive system comprising:

a spindle motor for rotating said information recording disc, said spindle motor having 3-phase stator windings each of which has first and second terminals, said first terminals being connected in common to each other;

signal reading means for reading the information from said information recording disc in units of the sectors;

battery means for generating a power supply voltage which is substantially 3 volts;

spindle motor drive means coupled to said second terminals of said 3-phase stator windings, said spindle motor drive means including first switching means for supplying currents from said battery means side and second switching means for supplying the currents to a ground side so as to successively select said windings to supply drive currents to the selected 2 windings of said 3-phase stator windings to rotate said spindle motor, said first and second switching means respectively including at least three MOSFETs having a low ON-resistance;

spindle motor control means for controlling a voltage, to be applied to said spindle motor drive means, so as to rotate said spindle motor in accordance with a back electromotive voltage of said 3-phase stator windings;

a voice coil motor for moving said head means to a target track of said information recording disc;

voice coil motor drive means coupled to said voice coil motor for supplying a current thereto, said voice coil motor drive means having at least one MOSFET having a low ON-resistance; and voice coil motor control means for detecting a servo signal at a head portion of each of said sectors of said information recording disc through said signal reading means so as to supply a control signal through an analog-to-digital converter to said voice coil motor drive means in accordance with the detected servo signal, said voice coil motor control means including at least one microprocessor.

4. A drive system for an information recording/reproducing apparatus having head means to record and reproduce information on and from an information recording disc divided into a plurality of tracks and a plurality of sectors, said drive system comprising:

a spindle motor for rotating said recording disc, said spindle motor having 3-phase stator windings each of which has first and second terminals, said first terminals being connected in common to each other;

signal reading means for reading the information from said information recording disc in units of the sectors;

battery means for generating a power supply voltage which is substantially below 5 volts;

spindle motor drive means coupled to said second terminals of said 3-phase stator windings, said spindle motor drive means including first switching means for supplying currents from said battery means side and second switching means for supplying the currents to a ground side so as to successively select said windings to supply drive currents to the selected 2 windings of said 3-phase stator windings to rotate said spindle motor, each of said first and second switching means comprising at least three MOSFETs having a low ON-resistance;

means comprising pulse width modulation means and integrating means to control said drive currents to be supplied to said second terminals of the selected 2 windings;

spindle motor control means for controlling a voltage, to be applied to said spindle motor drive means, through said pulse width modulation means so as to rotate said spindle motor in accordance with a back electromotive voltage occurring due to said 3-phase stator windings;

a voice coil motor for moving said head means to a target track of said information recording disc;

voice coil motor drive means coupled to said voice coil motor to supply a current thereto; and voice coil motor control means for detecting a servo signal at a head portion of each of said sectors of said information recording disc through said signal reading means so as to supply a control signal to said voice coil motor drive means in accordance with the detected servo signal.

5. A drive system for an information recording/reproducing apparatus having head means to record and reproduce information on and from an information recording disc divided into a plurality of tracks and a plurality of sectors, said drive system comprising:

a spindle motor for rotating said information recording disc, said spindle motor having 3-phase stator windings each of which has first and second terminals, said first terminals being connected in common to each other;

spindle motor drive means connected to said second terminals of said 3-phase stator windings for driving said spindle motor, said spindle motor drive means including first transistor directly coupled to a power supply and second transistor for supplying currents to a ground side whereby drive currents are supplied to selected 2 windings of said 3-phase stator windings;

control means for controlling the drive currents to be supplied to the second terminals of the selected 2 windings of said 3-phase stator windings;

a voice coil motor for moving said head means to a target track of said information recording disc, said voice coil motor having windings each having first and second terminals;

voice coil motor drive means for supplying a current to said voice coil motor;

power supply voltage detecting means for detecting a lowering state of said power supply;

first switching means for performing a connection between at least one of said windings of said spindle motor and said first terminal of said windings of said voice coil motor in accordance with an output of said power supply voltage detecting means; and second switching means for coupling said second terminal of said winding of said voice coil motor to said ground side in accordance with the output of said power supply voltage detecting means, wherein, in the case that said power supply voltage is lowered during rotation of said spindle motor, a back electromotive voltage occurring due to said windings of said spindle motor during the rotation of said spindle motor is supplied to said voice coil motor so as to move said head means to a predetermined position.

* * * * *